(12) United States Patent
Hoefer et al.

(10) Patent No.: US 7,666,813 B2
(45) Date of Patent: Feb. 23, 2010

(54) ABSORPTION MEDIUM AND DEACIDIFICATION OF FLUID STREAMS

(75) Inventors: Frank Hoefer, Ludwigshafen (DE); Norbert Asprion, Mannheim (DE); Iven Clausen, Mannheim (DE); Hans Hasse, Kaiserslautern (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 389 days.

(21) Appl. No.: 11/073,618

(22) Filed: Mar. 8, 2005

(65) Prior Publication Data

US 2005/0202967 A1    Sep. 15, 2005

(30) Foreign Application Priority Data

Mar. 9, 2004   (DE) .................. 10 2004 011 427

(51) Int. Cl.
*B01J 20/22* (2006.01)
(52) U.S. Cl. ...................... 502/401; 423/229
(58) Field of Classification Search ............... 502/400, 502/401; 423/228, 229
See application file for complete search history.

(56) References Cited

U.S. PATENT DOCUMENTS

| 3,137,654 | A |   | 6/1964 | Johnson et al. | |
| 4,217,238 | A | * | 8/1980 | Sartori et al. | 252/192 |
| 4,440,731 | A |   | 4/1984 | Pearce | |
| 4,483,833 | A | * | 11/1984 | Stogryn et al. | 423/228 |
| 5,618,506 | A | * | 4/1997 | Suzuki et al. | 423/228 |

FOREIGN PATENT DOCUMENTS

DE    3714209 A1    10/1987

\* cited by examiner

*Primary Examiner*—Edward M Johnson
(74) *Attorney, Agent, or Firm*—Oblon, Spivak, McClelland, Maier & Neustadt, L.L.P.

(57) ABSTRACT

An absorption medium for deacidifying fluid streams which has improved oxidation stability includes at least one aliphatic amine, and at least one non-hydroquinoid antioxidant. The absorption medium may be employed in deacidifying a fluid stream, in particular an oxygen-containing fluid stream, when the fluid stream is brought into intimate contact with the absorption medium in at least one absorption step.

9 Claims, 2 Drawing Sheets

ABSORPTION MEDIUM AND DEACIDIFICATION OF FLUID STREAMS

BACKGROUND

The present invention relates to an absorption medium for deacidifying a fluid stream which comprises acid gases as impurities, and to a process for using the absorption medium.

In numerous processes of the chemical industry, fluid streams occur which comprise acid gases, for example $CO_2$, $H_2S$, $SO_2$, $CS_2$, HCN, COS, disulfides or mercaptans as impurities. These fluid streams can be, for example, gas streams, such as natural gas, synthesis gas, refinery gas, or reaction gases which are formed in the oxidation of organic materials, for example organic wastes, coal, natural gas or petroleum, or in the composting of waste matters containing organic substances.

Removing the acid gases is of particular importance for different reasons. For example, the content of sulfur compounds in the natural gas must be reduced by suitable treatment measures directly at the natural gas well, since the sulfur compounds, together with the water frequently entrained by the natural gas, also form acids which act corrosively. Therefore, for transporting the natural gas in a pipeline, preset limiting values of the sulfur impurities must be maintained. The acid gases must be removed from the reaction gases formed in the oxidation of organic materials to prevent the emission of gases which can damage the natural environment or affect the climate.

On an industrial scale, aqueous solutions of organic bases, for example alkanolamines, are frequently used as absorption media. When acid gases dissolve, ionic products form from the base and the acid gas constituents. The absorption medium can be regenerated by expansion to a lower pressure, or stripping, with the ionic products back-reacting it to form acid gases and/or the acid gases being stripped off by steam. After the regeneration process the absorption medium can be reused. Preferred alkanolamines used in the removal of acid gas impurities from hydrocarbon gas streams comprise monoethanolamine (MEA), diethanolamine (DEA), triethanolamine (TEA), diethylethanolamine (DEEA), diisopropylamine (DIPA), aminoethoxyethanol (AEE) and methyldiethanolamine (MDEA).

The known absorption media are highly suitable for deacidifying hydrocarbon streams such as natural gas. Certain problems occur in the treatment of oxygen-containing fluids, for example flue gases. In this case the absorption capacity of the absorption medium is impaired in the long term and is not completely recovered on regeneration. It is probable that the presence of molecular oxygen is responsible for oxidative destruction of the amines present in the absorption medium.

U.S. Pat. No. 3,137,654 proposes adding complexing agents, such as N,N-di-hydroxyethylglycine, N-hydroxyethylethylenediaminetriacetic acid sodium salt or ethylenediaminetetraacetic acid sodium salt, to the absorption medium to slow down the oxidative breakdown of the absorption medium.

U.S. Pat. No. 4,440,731 teaches adding more than 50 ppm of $Cu^{2+}$ ions, if appropriate mixed with dihydroxyethylglycine, an alkali metal carbonate, an alkali metal permanganate or ammoniumpermanganate and nickel oxide and/or bismuth oxide, to the absorption medium for stabilization.

It is known to use antioxidants to stabilize inanimate organic materials, such as molding compounds or paints, against the action of oxygen, light and/or heat. The mode of action of the antioxidants is based on the fact that the propagation step of a free-radically induced peroxidation reaction is interrupted, for example by the antioxidants transferring an H atom to the intermediate peroxyl free radical. Many antioxidants additionally act as reducing agents. The use of antioxidants to stabilize liquid absorption media has not hitherto been mentioned, since those skilled in the art would expect, in the case of intimate and intensive contact of the absorption medium with oxygen-containing fluids, a direct reaction of the antioxidant with the oxygen, the antioxidant would be consumed, without developing a stabilizing action.

SUMMARY

It is an object underlying the invention to specify an absorption medium and a process for deacidifying fluid streams, the absorption capacity of the absorption medium being maintained in the long term.

We have found that this object is achieved by an absorption medium which comprises at least one aliphatic amine and at least one non-hydroquinoid antioxidant.

The invention further relates to a process for deacidifying a fluid stream in which, in at least one absorption step, the fluid stream is brought into intimate contact with an abovedefined absorption medium.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF EXEMPLARY EMBODIMENTS

The oxygen uptake of the inventive absorption medium is less than that of a comparison absorption medium of identical composition but which does not contain antioxidant. "Oxygen uptake" of the absorption medium is taken to mean the volume of oxygen which is consumed by reaction with the absorption medium. It can readily be determined by measuring the change in volume of a closed system which contains a defined amount of absorption medium and a defined amount of an oxygen-containing gas under isobaric conditions, or the change in pressure of the closed system under isochoric conditions. In a suitable test, over a period of 200 hours, air is introduced in the form of gas bubbles by stirring into the absorption medium to be tested at 25° C. and 1000 mbar. Preferred absorption media under these conditions have an oxygen uptake which is at least 5%, preferably at least 10%, and in particular at least 15%, lower than that of a comparison absorption medium of identical composition but without antioxidant.

"Deacidifying" means the complete or partial removal of acid gases and/or precursor compounds thereof, for example $CO_2$, $H_2S$, $SO_2$, $CS_2$, HCN, COS, disulfides or mercaptans, from the fluid stream.

The absorption medium and process are suitable, in particular, for deacidifying oxygen-containing fluid streams which comprise, for example, from 1 to 80% by volume, usually from 2 to 20% by volume, of oxygen.

The oxygen-containing fluid stream is generally a gas stream which is formed in the following manner:
a) oxidation of organic substances, for example flue gases,
b) composting and storage of waste matter comprising organic substances, or
c) bacterial decomposition of organic substances.

The oxidation can be carried out with appearance of flame, that is to say as conventional combustion, or as oxidation without appearance of flame, for example in the form of a catalytic oxidation or partial oxidation. Organic substances which are subjected to combustion are customarily fossil fuels such as coal, natural gas, petroleum, gasoline, diesel, raffinates or kerosene, biodiesel or waste matter having a content of organic substances. Starting materials of the catalytic (partial) oxidation are, for example, methanol or methane, which can be reacted to form formic acid or formaldehyde.

Waste matter which is subjected to oxidation, composting or storage, is typically domestic refuse, plastic waste or packaging refuse.

The organic substances are usually burnt with air in a conventional incineration plants. Waste matter comprising organic substances is generally composted and stored on refuse landfills. The offgas or the off-air of such plants can advantageously be treated by the inventive process.

Organic substances for bacterial decomposition are customarily stable manure, straw, liquid manure, sewage sludge, fermentation residues and the like. The bacterial decomposition takes place, for example, in customary biogas plants. The off-air of such plants can advantageously be treated by the inventive process.

The process is also suitable for treating the off-gases of fuel cells or chemical synthesis plants which make use of a (partial) oxidation of organic substances.

In addition, the inventive process can of course also be used to treat unburnt fossil gases, such as natural gas, for example coal-seam gases, that is to say gases produced in the extraction of coal which are collected and compressed.

Generally these gas streams comprise, under standard conditions, less than 50 mg/m$^3$ of sulfur dioxide.

The starting gases can either have the pressure which approximately corresponds to the pressure of the ambient air, that is to say, for example, atmospheric pressure, or a pressure which deviates from atmospheric pressure by up to 0.2 bar. In addition, the starting gases can have a higher pressure than atmospheric pressure, for example a pressure up to 20 bar. Starting gases having a higher pressure are formed by compression of starting gases of a pressure which is the vicinity of the pressure of the ambient air, or by producing the starting gas at an elevated pressure, for example by oxidizing organic substances using compressed air. The resultant volumetric flow rate of the gas decreases as a result and in addition the partial pressure of the acid gases to be removed increases, which is advantageous for the absorption and the resulting regeneration requirement. Disadvantages are, firstly, the expenditure on compression (capital cost and operating cost) and any additional higher resultant capital cost from the use of pressurized apparatus, so that here there is a cost optimum.

Suitable aliphatic amines are those which are customarily used for deacidifying fluid streams, in particular primary, secondary or tertiary amines having from 4 to 12 carbon atoms,
alkanolamines having from 2 to 12, preferably from 4 to 12, carbon atoms,
cyclic amines having a 5-, 6- or 7-membered saturated ring which contains a nitrogen atom and if appropriate a further heteroatom, in particular an oxygen or nitrogen atom, and mixtures thereof.

The aliphatic amines are customarily used in the form of their aqueous solutions having a total amine content generally from 10 to 70% by weight, preferably from 25 to 60% by weight. The solutions can comprise, additionally to water or instead of water, physical solvents which are selected, for example, from cyclotetramethylene sulfone (sulfolane) and derivatives thereof, aliphatic acid amides (acetylmorpholine, N-formylmorpholine), N-alkylated pyrrolidones and corresponding piperidones, such as N-methylpyrrolidone (NMP), propylene carbonate, methanol, dialkyl ethers of polyethylene glycols and mixtures thereof.

Preferred absorption media are those which comprise at least one alkanolamine, in particular monoethanolamine (MEA), diethanolamine (DEA), triethanolamine (TEA), diethylethanolamine (DEEA), diisopropylamine (DIPA), aminoethoxyethanol (AEE) and methyldiethanolamine (MDEA) and mixtures thereof.

The absorption medium described in U.S. Pat. No. 4,336,233 is very particularly proven. This is an aqueous solution of methyldiethanolamine (MDEA) and piperazine as absorption accelerator or activator (aMDEA®, BASF AG, Ludwigshafen). The wash liquid described there comprises from 1.5 to 4.5 mol/l of methyldiethanolamine (MDEA) and from 0.05 to 0.8 mol/l, preferably up to 0.4 mol/l, of piperazine.

The antioxidants used do not have a hydroquinoid structure, that is to say they do not have free hydroxyl groups arranged in the o- or p-position to an aromatic ring. In particular, o- and p-hydroquinone and nuclear-alkylated derivatives thereof are unsuitable, whereas the monoethers or monoesters thereof are suitable.

Suitable antioxidants are all compounds which are able to interrupt the propagation step of a peroxidation reaction induced by molecular oxygen. Such compounds are customarily termed antioxidants, UV absorbers or peroxide decomposers. Specific examples are the following compounds which can be used individually or as a mixture of two or more compounds:

Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-di-cyclopentyl-4-methylphenol, 2-(o:-methylcyclohexyl)-4,6-dimethylphenol, 2,6-di-octadecyl-4-methylphenol, 2,4,6-tricyclohexylphenol, 2,6-di-tert-butyl-4-methoxymethylphenol, linear or side-chain branched nonylphenols, for example 2,6-di-nonyl-4-methylphenol, 2,4-dimethyl-6-(1'-methyl-undec-1'-yl)-phenol, 2,4-dimethyl-6-(1'-methylheptadec-1'-yl)-phenol, 2,4-dimethyl-6-(1'-methyl-tridec-1'-yl)-phenol and mixtures thereof.

Alkylthiomethylphenols, for example 2,4-di-octylthiomethyl-6-tert-butylphenol, 2,4-di-octylthiomethyl-6-methylphenol, 2,4-di-octylthiomethyl-6-ethylphenol, 2,6-di-dodecyl-thiomethyl-4-nonylphenol.

Hydroquinone monoethers and monoesters, for example 4-methoxyphenol, 2,6-di-tert-butyl-4-methoxyphenol, 2,6-diphenyl-4-octadecyloxyphenol, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

Tocopherols, for example α-tocopherol, β-tocopherol, γ-tocopherol, δ-tocopherol and mixtures thereof (vitamin E) and also vitamin E derivatives having a modified side chain of the flavone ring (for example Tolux®).

Hydroxylated thiodiphenyl ethers, for example 2,2'-thio-bis(6-tert-butyl-4-methylphenol), 2,2'-thio-bis(4-octylphenol), 4,4'-thio-bis(6-tert-butyl-3-methylphenol), 4,4'-thio-bis-(6-tert-butyl-2-methylphenol), 4,4'-thio-bis(3,6-di-sec-amylphenol), 4,4'-bis(2,6-dimethyl-4-hydroxyphenyl) disulfide.

Alkylidene bisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(o-methylcyclohexyl)-phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)-butyrate], bis(3-tert-butyl-4-hydroxy-5-methylphenyl)-dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

O- , N- and S-benzyl compounds, for example 3,5,3',5'-tetra-tert-butyl-4,4,-dihydroxy-dibenzyl ether, octadecyl-4-hydroxy-3,5-dimethylbenzylmercaptoacetate, tridecyl-4-hydroxy-3,5-ditert-butylbenzyl mercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl)sulfide, isooctyl-3,5-di-tert-butyl-4-hydroxybenzyl mercaptoacetate.

Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl) malonate, di-dodecylmercaptoethyl-2,2-bis(3,5-di-tert-butyl-4-hydroxybenzyl) malonate, di-[4-(1,1,3,3-tetramethylbutyl)-phenyl]-2,2-bis(3,5-di-tert-butyl-4-hydroxybenzyl) malonate.

Hydroxybenzyl aromatics, for example 1,3,5-tris(3,5-di-tert-butyl-4-hydroxybenzyl)-2,4,6-trimethylbenzene, 1,4-bis (3,5-di-tert-butyl-4-hydroxybenzyl)-2,3,5,6-tetramethylbenzene, 2,4,6-tris-(3,5-di-tert-butyl-4-hydroxybenzyl)phenol.

Triazine compounds, for example 2,4-bis-octylmercapto-6-(3,5-di-tert-butyl-4-hydroxy-anilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl)-hexahydro-1,3,5-triazine, 1,3,5-tris(3,5-di-cyclohexyl-4-hydroxybenzyl)isocyanurate.

Benzylphosphonates, for example dimethyl 2,5-di-tert-butyl-4-hydroxybenzyl-phosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methyl-benzylphosphonate, Ca salt of the 3,5-di-tert-butyl-4-hydroxybenzyl-phosphonic acid monoethyl ester.

Acylaminophenols, for example 4-hydroxylauranilide, 4-hydroxystearanilide, N-(3,5-di-tert-butyl-4-hydroxyphenyl)carbamic acid octyl ester.

Esters of β-(3,5-di-tert-butyl-4-hydroxyphenyl)propionic acid with monohydric or polyhydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo-[2.2.2]octane.

Esters of β-(5-tert-butyl-4-hydroxy-3-methylphenyl)propionic acid with monohydric or polyhydric alcohols, for example with methanol, ethanol, n-octanol, isooctanol, octadecanol, 1,6-hexanediol, 1,9-nonanediol, ethylene glycol, 1,2-propane diol, neopentyl glycol, thiodiethylene glycol, diethylene glycol, triethylene glycol, pentaerythritol, tris(hydroxyethyl)isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-noxabicyclo-[2.2.2]octane.

Esters of β-(3,5-dicyclohexyl-4-hydroxyphenyl)propionic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy-ethyl)isocyanurate, N,N'-bis(hydroxyethyl)oxalamide, 3-thiaundecanol, 3-thiapenta-decanol, trimethylhexanediol, trimethylolpropane, 4-hydroxymethyl-1-phospha-2,6,7-trioxabicyclo-[2.2.2]octane.

Esters of 3,5-di-tert-butyl-4-hydroxyphenylacetic acid with monohydric or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)iso-cyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxa-bicyclo-[2.2.2]octane.

Amides of β-(3.5-di-tert-butyl-4-hydroxyphenyl)propionic acid, for example N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]-propionyloxy)ethyl]oxamide (Naugard TM XL-1 from Uniroyal).

Ascorbic acid (Vitamin C).

Aminic antioxidants, for example N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di-(2-naphthyl)-p-phenylenediamine, N-isopropyl-N-phenyl-p-phenylenediamine, N-(1,3-dimethylbutyl)-N-phenyl-p-phenylenediamine, N-(1-methylheptyl)-N-phenyl-p-phenylenediamine, N-cyclohexyl-N-phenyl-p-phenylenediamine, 4-(p-toluenesulfonamido) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyidiphenylamine, 4-n-butylaminophenol, 4-butyrylaminophenol, 4-nonanoylaminophenol, 4-dodecanoylaminophenol, 4-octadecanoylaminophenol, di-(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-di-[(2-methylphenyl)amino] ethane, 1,2-di-(phenylamino)propane, tolyl biguanide, di-[4-(1',3'-dimethylbutyl)phenyl]amine, tert-octylated N-phenyl-1-naphthylamine, mixture of mono- and dialkylated tert-butyl/tert-octyldiphenylamines, mixture of mono- and dialkylated nonyldiphenylamines, mixture of mono- and dialkylated dodecyldiphenylamines, mixture of mono- and dialkylated isopropyl/isohexyldiphenylamines, mixtures of mono- and dialkyated tert-butyldiphenyl-amines, 2,3-dihydro-3,3-dimethyl-4H-1,4-benzothiazine, phenothiazine, mixture of mono- and dialkylated tert-butyl/tert-octylphenothiazines, mixture of mono- and dialkylated tert-octylphenothiazines, N-allylphenothiazine.

2-(2'-Hydroxyphenyl)benzotriazoles, for example 2-(2'-hydroxy-5'-methylphenyl)benzo-triazole, 2-(3',5'-di-tert-butyl-2'-hydroxyphenyl)benzotriazole, 2-(5'-tert-butyl-2'-hydroxy-phenyl)benzotriazole, 2-(2'-hydroxy-5'-(1,1,3,3-tetramethylbutyl)phenyl)benzotriazole, 2-(3',5'-di-tert-butyl-2-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2-hydroxy-4-octoxyphenyl)benzotriazole, 2-(3,5-di-tert-amyl-2-hydroxyphenyl)benzotriazole, 2-(3,5-bis(alpha, alpha-dimethylbenzyl)-2-hydroxy-phenyl)benzotriazole, 2-(3'-tert-butyl-2'-hydroxy-5-(2-octyloxycarbonylethyl)phenyl)-5-chlorobenzotriazole, 2-(3'-tert-butyl-5-[2-(2-ethylhexyloxy)carbonylethyl]-2-hydroxy-phenyl)-5-chlorobenzotriazole, 2-(3'-tert-butyl-2'-hydroxy-5-(2-methoxycarbonyl-ethyl)phenyl)-5-chlorobenzotriazole, 2-(3'-tert-butyl-2'-hydroxy-5'-(2-methoxycarbonyl-ethyl) phenyl)benzotriazole, 2-(3'-tert-butyl-2'-hydroxy-5-(2-octyloxycarbonylethyl)-phenyl)benzotriazole, 2-(3'-tert-butyl-5'-[2-(2-ethylhexyloxy)carbonylethyl]-2-hydroxy-phenyl) benzotriazole, 2-(3'-dodecyl-2'-hydroxy-5-methylphenyl) benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazol-2-ylphenol], transesterification product of 2-[3-tert-butyl-5'-(2-methoxycarbonylethyl)-2-hydroxyphenyl]benzotriazole with poly-ethylene glycol 300;

2-hydroxybenzophenones, for example the 4-hydroxy-, 4-methoxy-, 4-octoxy-, 4-decyloxy-, 4-dodecyloxy-, 4-benzyloxy-, 4,2',4'-trihydroxy-, 2'-hydroxy-4,4'-dimethoxy-derivative.

Esters of optionally substituted benzoic acids, for example 4-tert-butylphenyl salicylate, phenyl salicylate, octylphenyl salicylate, dibenzoyl resorcinol, bis(4-tert-butylbenzoyl) resorcinol, benzoyl resorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

Acrylates, for example α-cyano-β,β-diphenylacrylic acid ethyl ester and isooctyl ester, alpha-carbomethoxycinnamic acid methyl ester, α-cyano-α-methyl-p-methoxycinnamic acid methyl ester and butyl ester, α-carbomethoxy-p-methoxycinnamic acid methyl ester, N-(β-carbomethoxy-p-cyanovinyl)-2-methylindoline.

Sterically hindered amines, for example 2,2,6,6-tetramethylpiperidin-4-one, 2,2,6,6-tetramethylpiperidin-4-ol, hexamethylenebis-triacetonediamine (HMBTAD), bis(2,2,6,6-tetramethylpiperidin-4-yl) sebacate, bis-(2,2,6,6-tetramethylpiperidin-4-yl) succinate, bis(1,2,2,6,6-pentamethylpiperidin-4-yl) sebacate, bis(1-octyloxy-2,2,6, 6-tetramethyl-piperidin-4-yl) sebacate, n-butyl-3,5-di-tert-butyl-4-hydroxybenzylmalonic acid bis-(1,2,2,6,6-pentamethylpiperidyl)ester, condensation product of 1-hydroxyethyl-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilo-triacetate, tetrakis(2,2,6,6-tetramethyl-4-piperidyl) 1,2,3,4-butanetetraoate, 1,1'-(1,2-ethanediyl)bis(3,3,5,5-tetramethylpiperazinone), 4-benzoyl-2,2,6,6-tetramethyl-piperidine, 4-stearyloxy-2,2,6,6-tetramethylpiperidine, bis(1,2,2,6,6-pentamethyl-piperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethyl-piperidyl) sebacate, bis(1-octyloxy-2,2,6,6-tetramethylpiperidyl) succinate, linear or cyclic condensation products of N,N'-bis-(2,2,6,6-tetramethyl-4-piperidyl)hexamethylenediamine and 4-morpholino-2,6-dichloro-1,3,5-triazine, condensation product of 2-chloro-4,6-di-(4-n-butylamino-2,2,6,6-tetramethylpiperidyl)-1,3,5-triazine and 1,2-bis(3-aminopropylamino)ethane, condensation product of 2-chloro-4,6-di-(4-n-butylamino-1,2,2,6,6-pentamethylpiperidyl)-1,3,5-triazine and 1,2-bis(3-amino-propylamino) ethane, 8-acetyl-3-dodecyl-7,7,9,9-tetramethyl-1,3,8-triazaspiro[4,5]-decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, mixture of 4-hexadecyloxy- and 4-stearyloxy-2,2,6,6-tetramethylpiperidine, condensation product of N,N'-bis(2,2,6,6-tetramethyl-4-piperidyl)hexamethylenediamine and 4-cyclohexyl-amino-2,6-dichloro-1,3,5-triazine, condensation product of 1,2-bis(3-aminopropyl-amino)ethane and 2,4,6-trichloro-1,3,5-triazine and also 4-butylamino-2,2,6,6-tetramethylpiperidine (CAS Reg. No. [136504-96-6]); N-(2,2,6, 6-tetramethyl-4-piperidyl)-n-dodecylsuccinimide, N-(1,2,2, 6,6-pentamethyl-4-piperidyl)-n-dodecylsuccinimide, 2-undecyl-7,7,9,9-tetramethyl-1-oxa-3,8-diaza-4-oxo-spiro [4,5]decane, reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxy-phenyl)ethene, N,N'-bis-formyl-N,N'-bis(2,2,6,6-tetramethyl-4-piperidyl)-hexa-methylenediamine, diesters of 4-methoxymethylenemalonic acid with 1,2,2,6,6-penta-methyl-4-hydroxypiperidine, poly [methylpropyl-3-oxy-4-(2,2,6,6-tetramethyl-4-piperidyl)]siloxane, reaction product of maleic anhydride alpha-olefincopolymer and 2,2,6,6-tetramethyl-4-aminopiperidine or 1,2,2,6,6-pentamethyl-4-aminopiperidine.

Oxalamides, for example 4,4-dioctyloxyoxanilide, 2,2-diethoxyoxanilide, 2,2-dioctyloxy-5,5'-di-tert-butyloxanilide, 2,2'-didodecyloxy-5,5'-di-tert-butyloxanilide, 2-ethoxy-2'-ethyl-oxanilide, N,N'-bis(3-dimethylaminopropyl)oxalamide, 2-ethoxy-5-tert-butyl-2-ethyl-oxanilide and its mixture with 2-ethoxy-2'-ethyl-5,4'-di-tert-butyloxanilide, mixtures of o- and p-methoxy and of o- and p-ethoxy-di-substituted oxanilides.

2-(2-Hydroxyphenyl)-1,3,5-triazines, for example 2,4,6-tris(2-hydroxy-4-octyloxy-phenyl)-1,3,5-triazine, 2-(2-hydroxy-4-octyloxyphenyl)-4,6-bis(2,4-dimethylphenyl)-1,3, 5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-do-decyloxyphenyl)-4,6-bis(2,4-dimethylphenyl)-1,3,5-triazine, 2-(2-hydroxy-4-tridecyl-oxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethyl-phenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-(2-hydroxy-4-[3-(2-ethylhexyl-1-oxy)-2-hydroxypropyloxy]phenyl)-4,6-bis(2,4-dimethylphenyl)-1,3,5-triazine.

Hydrazines, for example, N-salicylal-N'-salicyloylhydrazine, N,N'-bis(salicyloyl)-hydrazine, N,N'-bis(3,5-di-tert-butyl-4-hydroxyphenylpropionyl)hydrazine, bis(benzylidene)oxalic acid dihydrazide, isophthalic acid dihydrazide, sebacic acid bis-phenylhydrazide, N,N'-diacetyladipic acid dihydrazide, N,N'-bis-salicyloyloxalic acid dihydrazide, N,N'-bis-salicyloylthiopropionic acid dihydrazide.

Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearyl pentaerythritol diphosphite, tris(2,4-di-tert-butylphenyl) phosphite, diisodecylpentaerythritol diphosphite, bis(2,4-di-tert-butylphenyl)penta-erythritol diphosphite, bis-(2,6-di-tert-butyl-4-methylphenyl)pentaerythritol diphosphite, bis(isodecyloxy)pentaerythritol diphosphite, bis(2,4-di-tert-butyl-6-methylphenyl) pentaerythritol diphosphite, bis-(2,4,6-tri-tert-butylphenyl)pentaerythritol diphosphite, tristearylsorbitol triphosphite, tetrakis(2,4-di-tert-butylphenyl)-4,4-biphenylenediphosphonite, 6-isooctyloxy-2,4,8,10-tetra-tert-butyl-12H-dibenzo[d,g]-1,3,2-dioxa-phosphocine, 6-fluoro-2,4,8,10-tetra-tert-butyl-12-methyl-dibenzo[d,g]-1,3,2-dioxa-phosphocine, bis(2,4-di-tert-butyl-6-methylphenyl)methyl phosphite, bis(2,4-di-tert-butyl-6-methylphenyl)ethyl phosphite, 2,2',2"-nitrilo[triethyl-tris(3,3',5,5'-tetra-tert-butyl-1,1'-biphenyl-2,2'-diyl)phosphite], 2-ethylhexyl-(3,3',5,5'-tetra-tert-butyl-1,1'-biphenyl-2,2'-diyl)phosphite.

Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxyl-amine from hydrogenated tallow fatty amines.

Nitrones, for example N-benzyl-α-phenyl nitrone, N-ethyl-α-methyl nitrone, N-octyl-α-heptyl nitrone, N-lauryl-α-undecyl nitrone, N-tetradecyl-α-tridecyl nitrone, N-hexadecyl-α-pentadecyl nitrone, N-octadecyl-α-heptadecyl nitrone, N-hexadecyl-α-heptadecyl nitrone, N-octadecyl-α-pentadecyl nitrone, N-heptadecyl-α-heptadecyl nitrone, N-octadecyl-α-hexadecyl nitrone, nitrones derived from N,N-dialkylhydroxylamines prepared from hydrogenated tallow fatty amines.

Nitroxyl free radicals, for example 1-oxyl-2,2,6,6-tetramethylpiperidine, 1-oxyl-2,2,6,6-tetramethylpiperidin-4-ol, 1-oxyl-2,2,6,6-tetramethylpiperidin-4-one, 1-oxyl-2,2,6,6-tetra-methylpiperidin-4-yl acetate, 1-oxyl-2,2,6,6-tetramethylpiperidin-4-yl 2-ethylhexanoate, 1-oxyl-2,2,6,6-tetramethylpiperidin-4-yl stearate, 1-oxyl-2,2,6,6-tetramethylpiperidin-4-yl benzoate, 1-oxyl-2,2,6,6-tetramethylpiperidin-4-yl(4-tert-butyl)benzoate, bis(1-oxyl-2,2,6,6-tetramethylpiperidin-4-yl) succinate, bis(1-oxyl-2,2,6,6-tetramethylpiperidin-4-yl) adipate, bis(1-oxyl-2,2,6,6-tetramethylpiperidin-4-yl) sebacate, bis(1-oxyl-2,2,6,6-tetra-methylpiperidin-4-yl)-n-butyl malonate, bis(1-oxyl-2,2,6,6-tetramethylpiperidin-4-yl) phthalate, bis(1-oxyl-2,2,6,6-tetramethylpiperidin-4-yl)isophthalate, bis(1-oxyl-2,2,6,6-tetramethylpiperidin-4-yl) terephthalate, bis(1-oxyl-2,2,6,6-tetramethylpiperidin-4-yl) hexyhydroterephthalate, N,N'-bis(1-oxyl-2,2,6,6-tetramethylpiperidin-4-yl) adipinamide, N-(1-oxyl-2,2,6,6-tetramethylpiperidin-4-yl) caprolactam, N-(1-oxyl-2,2,6,6-tetramethyl-piperidin-4-yl)dodecyl succinimide, 2,4,6-tris-[N-butyl-N-(1-oxyl-2,2,6,6,-tetramethyl-piperidin-4-yl]-s-triazine, N,N'-bis(1-oxyl-2,2,6,6-tetramethylpiperidin-4-yl)-N,N'-bis-formyl-1,6-diaminohexane, 4,4'-ethylenebis(1-oxyl-2,2,6,6-tetramethylpiperazin-3-one) and tris-(2,2,6,6-tetramethyl-1-oxylpiperidin-4-yl)phosphite.

Peroxide-decomposing compounds, for example esters of β-thiodipropionic acid, for example the lauryl, stearyl, myristyl or tridecyl esters, mercaptobenzimidazole, the zinc salt of 2-mercaptobenzimidazole, zinc dibutyl dithiocarbamate, dioctadecyl disulfide, pentaerythritol tetrakis(p-dodecylmercapto)propionate.

Boron compounds, in particular borinic acids and esters, for example diphenylborinic anhydride, dimesitylborinic acid, 2-aminoethyl dibutylborinate, 2-aminoethyl diphenylborinate, diethylmethoxyborane, dibutylboryl trifluoromethanesulfonate, Boronic acids and esters, for example butylboronic acid, cyclopentylboronic acid, phenylboronic acid (if appropriate mixed with anhydride), phenylboronic anhydride, 4-chlorophenylboronic acid, 4-chlorophenylboronic acid dibutyl ester, 2,6-dichloro-phenylboronic acid, 4-bromophenylboronic acid (if appropriate mixed with anhydride), 3-trifluoromethylphenylboronic acid, 3,5-bis(trifluoromethyl)phenylboronic acid (if appropriate mixed with anhydride), 4-methoxyphenylboronic acid, 4-methylthio-phenylboronic acid, 3-(aminocarbonyl)phenylboronic acid, 4-(aminocarbonyl)-phenylboronic acid, 4-carboxyphenylboric acid, 4-aminomethylphenylboric acid hydrochloride, 2-formylphenylboronic acid (if appropriate mixed with anhydride), 3-formylphenylboric acid, 2-[(1,1-dimethylethoxy)methyl]phenylboric acid, 3-aminophenylboric acid (if appropriate mixed with anhydride), 4-benzyloxyphenylboric acid, 4-biphenylboronic acid, 4-tolylboronic acid, 2,5-dihexyl-1,4-phenylenebisboronic acid, 2-thiopheneboronic acid, 3-thiopheneboronic acid, (2,3-dihydro-1,4-benzodioxin-6-yl)boronic acid, 3-bromo-2-thienylboronic acid, 4-methoxy-3-pyridinylboronic acid, 2,4-bis(1,1-dimethylethoxy)-5-pyrimidinylboric acid, [2,4-bis(phenylmethoxy)-5-pyrimidinylboric acid, 4,4,4',4',5,5,5',5'-octamethyl-2,2'-bidioxaborolane, bis(pinacolato)diboron, diisopropoxymethylborane;

Boric acid and esters, for example tributyl borate, boric acid tris-(methoxyethyl)ester, borax (and hydrates thereof), tetrakis(1-pyrazolyl)borate, trityl(tetrapentafluorophenyl)-borate, hydro-tris(3-phenylpyrazol-1-yl)borate, potassium tetrakis(4-chlorophenyl)-borate, sodium tetrakis(4-fluorophenyl)borate, sodium tetraphenylborate;

Boranes, for example borane complexes with electron donors, for example borane-4-methylmorpholine, borane dimethylamine, borane methyl sulfide, borane pyridine, borane tetrahydrofuran, borane trimethylamine, borane-tertbutylamine complex, tributylborane, tri-s-butylborane, triethylborane, triethylborane-1,3-diaminopropane complex, trimesitylborane, triphenylborane, triphenylborane triphenylphosphine complex, tris(4-methoxyphenyl)borane ammonia complex, tri-4-tolylborane, tris(pentafluorophenyl) boron, diethyl-(3-pyridyl)borane, B-methoxydiisopinocampheyl-borane, (2-borophenyl)carbaminic acid C-(1,1-dimethylethyl)ester, (S,S)-1,2-bis[(tert-butyl)methylphosphino] ethane-bis(borane), 1,2-bis(tert-butylthio)ethaneborane, 2-(4-borophenyl)-4-quinolinecarboxylic acid, 2-(4-borophenyl)-6-methyl-4-quinoline-carboxylic acid, 2-boro-1H-pyrrole-1-carboxylic acid 1-(1,1-dimethylethyl)ester, 2-boro-1-pyrrolidinecarboxylic acid 1-(1,1-dimethylethyl)ester, 2-(diethylboryl)pyridine, 9-borabicyclo-3,3,1-nonane (BBN), BBN dimer, 9-methoxy-9-borabicyclo(3.3.1) nonane, B-bromocatecholborane;

Diazaborinines, for example 1-butyl-1,2-dihydrothieno[3,2-D][1,2,3]diazaborinine, 1-methyl-1,2-dihydrothieno[2,3-D][1,2,3]diazaborinine, 2-phenyl-2,3-dihydro-1,3,2-benzodiazaborinine-4(1H)-thione, 4-(hydroxy(oxido)amino) thieno[2,3-D][1,2,3]-diazaborinine-1 (2H)-ol, 4-methylthieno[3,2-D][1,2,3]diazaborinin-1 (2H)-ol, dibenzo[C, E][1,2]azaborinin-6(5H)-ol, thieno[3,4-D][1,2,3]diazaborinin-1 (2H)-ol, phenyl-dioxaborinane, trimethylboroxine;

Borocanes, for example 2-(3-chlorophenyl)-6-methyl-[1,3,6,2]dioxazaborocane, 2-(3-fluorophenyl)-6-methyl-[1,3,6,2]dioxazaborocane, 2-(4-chlorophenyl)-6-methyl-[1,3,6,2] dioxazaborocane, 2-(4-fluorophenyl)-6-methyl-[1,3,6,2] dioxazaborocane, 2,2'-(1,3-propanediylbis(oxy))bis-1,3,2-dioxaborinane, 2,2-diphenyl-1-oxa-3-oxonia-2-boratanaphthalene[(2-hydroxybenzaldehydato-O,O') diphenylboron, 6-methyl-2-m-tolyl-[1,3,6,2] dioxazaborocane, 6-methyl-2-p-tolyl-[1,3,6,2] dioxazaborocane;

Diheteroatom boroles, for example 2-phenyl-1,3,2-benzodiazaborole, 2-phenyl-1,3,2-benzodioxaborole, 2-(4-methylphenyl)-2,3-dihydro-1H-1,3,2-benzodiazaborole, propyl-benzodioxaborole, Borazines, for example 2,4,6-triethylborazine, 2,4,6-triphenylborazine.

Of these, compounds having peroxide-decomposing activity are preferred, in particular phosphites, phosphonites and boron compounds.

The antioxidants or the combination of antioxidants is added to the absorption medium generally in an amount of from 20 ppm to 5% by weight, usually from 50 ppm to 1.5% by weight, preferably from 100 ppm to 1% by weight.

In the continuous procedure of the deacidification process, the antioxidant situated in the absorption medium circuit is gradually consumed. It is therefore preferred to add antioxidant to the absorption medium periodically or continuously to maintain an effective concentration of the antioxidant in the absorption medium circuit. The antioxidant can be added as such or as a solution of the antioxidant in a suitable solvent. It is also possible to introduce the antioxidant by means of the absorption medium volume which is continuously supplemented to compensate for losses which are discharged via the deacidified fluid stream and/or the acid gases. To avoid increase in levels of decomposition products of the antioxidant in the absorption medium circuit, it can be appropriate to eject continuously or periodically a portion of the absorption medium situated in the circuit and/or to remove the decomposition products continuously, for example by filtration, phase separation, stripping, ion-exchange treatment or other suitable processes.

Apparatuses suitable for carrying out the inventive process comprise at least one scrubbing column, for example random packing columns, ordered packing columns, tray columns and/or other absorbers such as membrane contactors, radial-stream scrubbers, jet scrubbers, venturi scrubbers and rotary spray scrubbers. The fluid stream is treated with the absorption medium, preferably in a scrubbing column in countercurrent. The fluid is generally fed into the lower region and the absorption medium into the upper region of the column.

The temperature of the absorption medium is, in the absorption step, generally from about 40 to 100° C., when a column is used, for example, from 40 to 70° C. at the top of the column and from 50 to 100° C. at the bottom of the column. The overall pressure in the absorption step is generally from about 0.5 to 20 bar, preferably from about 0.7 to 12 bar, particularly preferably from 0.7 to 6. Very particularly preferably, the pressure is atmospheric pressure or pressure which deviates from atmospheric pressure by up to 0.2 bar. A product gas (accompanying gas) which is low in acid gas constituents, that is to say depleted in these constituents, and an absorption medium loaded with acid gas constituents are obtained.

The inventive process can comprise one or more, in particular two, sequential absorption steps. The absorption can be carried out in a plurality of sequential substeps, the crude gas containing the acid gas constituents being brought into contact in each of the substeps in each case with a substream of the absorption medium. The absorption medium with which the crude gas is brought into contact can already be in part loaded with acid gases, that is to say can be, for example, an absorption medium which has been recirculated from a subsequent absorption step to the first absorption step, or a partially regenerated absorption medium. With regard to the procedure of the two-stage absorption, the publications EP-A 0 159 495, EP-A 020 190 434, EP-A 0 359 991 and WO 00100271 are incorporated herein by reference.

According to a preferred embodiment, the inventive process is carried out in such a manner that the fluid comprising the acid gases is first treated in a first absorption step with an absorption medium at a temperature of from 40 to 100° C., preferably from 50 to 90° C., and in particular from 60 to 90° C. The fluid depleted in acid gases is then treated in a second absorption step with the absorption medium at a temperature of from 30 to 90° C., preferably from 40 to 80° C. and in particular from 50 to 80° C. The temperature here is from 5 to 20° C. lower than in the first absorption stage.

The acid gas constituents can be released from the absorption medium loaded with the acid gas constituents in a conventional manner (similarly to the publications cited hereinafter) in a regeneration step, a regenerated absorption medium being obtained. In the regenerated step, the loading of the absorption medium is decreased and the resultant regenerated absorption medium is preferably then recirculated to the absorption step.

Generally, the regeneration step comprises at least one pressure expansion of the loaded absorption medium from a high pressure, as prevails when the absorption step is carried out, to a lower pressure. The pressure expansion can be performed, for example, by means of a throttle valve and/or an expansion turbine. The regeneration using an expansion stage is described, for example, in the publications U.S. Pat. No. 4,537,753 and U.S. Pat. No. 4,553,984.

The acid gas constituents can be released in the regeneration step, for example, in an expansion column, for example a vertically or horizontally installed flash vessel, or in a countercurrent-flow column equipped with internals. A plurality of expansion columns can be connected in series, in which regeneration is performed at differing pressures.

For example, regeneration can be performed in a preliminary expansion column at high pressure which is typically about 1.5 bar above the partial pressure of the acid gas constituents in the absorption step, and in a main expansion column, at low pressure, for example from 1 to 2 bar absolute. Regeneration using two or more expansion stages is described in the publications U.S. Pat. No. 4,537,753, U.S. Pat. No. 4,553,984, EP-A 0 159 495, EP-A 0 202 600, EP-A 0 190 434 and EP-A 0 121 109.

The last expansion stage can also be carried out under vacuum which is generated, for example, by means of a steam ejector, if appropriate in combination with a mechanical vacuum generation apparatus, as described in EP-A 0 159 495, EP-A 0 202 600, EP-A 0 190 434 and EP-A 0 121 109 (U.S. Pat. No. 4,551,158).

The invention will now be described in more detail on the basis of the accompanying figures and the examples hereinafter.

Figure 1:
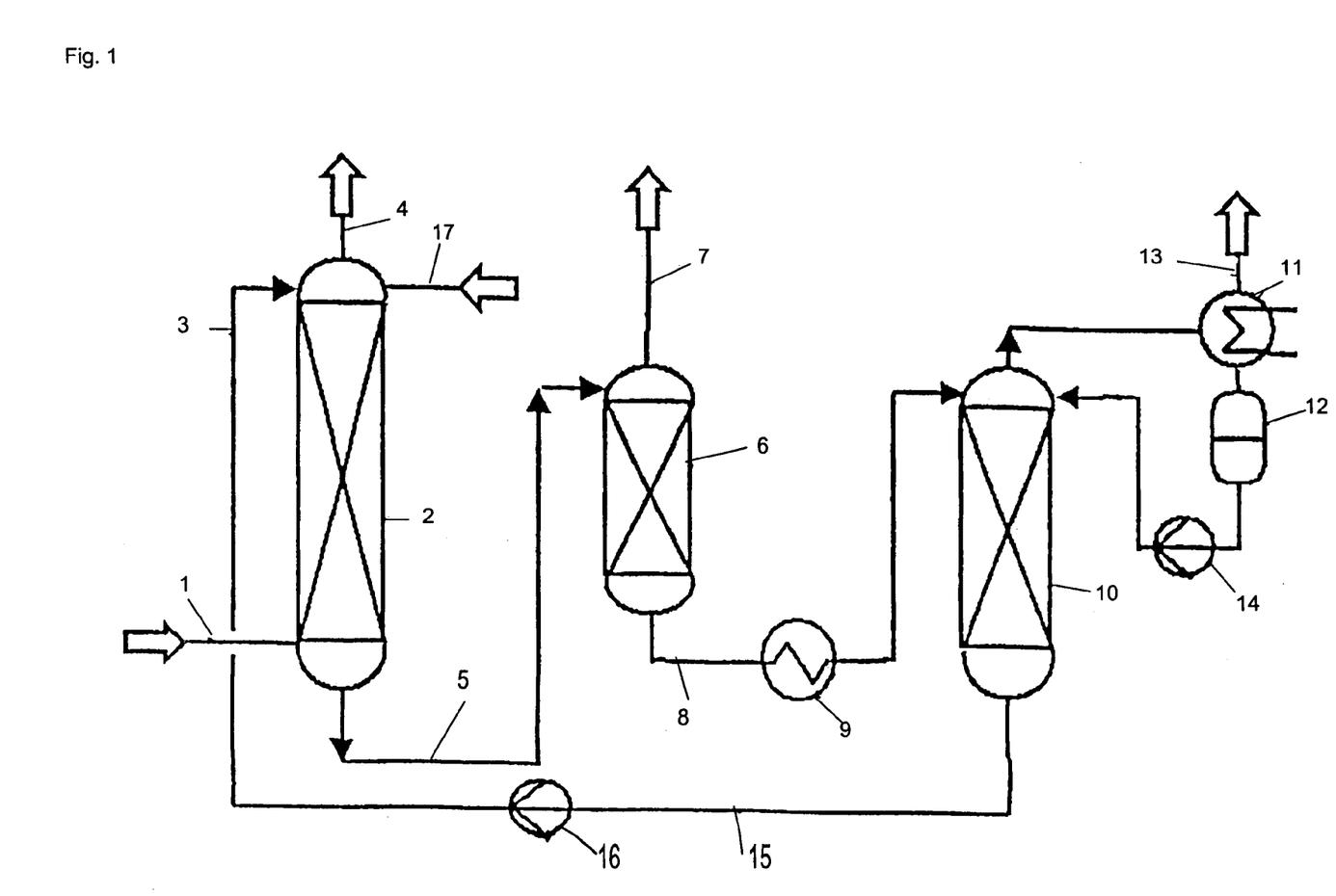
FIG. 1 is a schematic depiction of an apparatus in which an absorption stage is carried out in a single stage and an expansion stage is carried out in two stages.

FIG. 1 diagrammatically presents an apparatus in which the absorption stage is carried out in a single stage and the expansion stage is carried out in two stages. The starting gas (hereinafter also termed feed gas) is fed into the lower region of the absorber 2, via line 1. The absorber 2 is a column packed with random packing to effect the mass transfer and heat exchange. The absorption medium which is a regenerated absorption medium having a low residual content of acid gases is applied via line 3 to the top of the absorber 2 in countercurrent to the feed gas. The gas depleted in acid gases leaves the absorber 2 overhead (line 4). The absorption medium enriched with acid gases leaves the absorber 2 at the bottom via line 5 and is passed into the upper region of the high pressure expansion column 6 which is generally operated at a pressure which is above the $CO_2$ partial pressure of the crude gas fed to the absorber. The absorption medium is generally expanded using conventional apparatuses, for example a level-control valve, a hydraulic turbine or a pump running in reverse. During the expansion the majority of the dissolved non-acid gases and a small portion of the acid gases are released. These gases are ejected overhead from the high-pressure expansion column 6 via line 7.

The absorption medium which is still loaded with the majority of the acid gases leaves the high-pressure expansion column via line 8 and is heated in the heat exchanger 9, in which a small part of the acid gases can be released. The heated absorption medium is introduced into the upper region of a low-pressure expansion column 10 which is equipped with a random packing to achieve a high surface area and thus effect the release of the $CO_2$ and the establishment of equilibrium. In the low-pressure expansion column 10, the greatest part of the $CO_2$ and the $H_2S$ are virtually completely released by flashing. The absorption medium is simultaneously regenerated and cooled in this manner. At the top of the low-pressure expansion column 10 a reflux condenser 11 is provided together with a collection vessel 12 to cool the released acid gases and condense a portion of the vapor. The majority of the acid gas leaves the reflux condenser 11 via line 13. The condensate is pumped back by means of pump 14 to the top of the low-pressure expansion column 10. The regenerated absorption medium which still contains a small proportion of the $CO_2$ leaves the low-pressure expansion column 10 at the bottom via line 15 and is applied by means of pump 16 via line 3 to the top of the absorber 2. Via line 17, fresh water can be fed in to compensate for the water discharged together with the gases.

Figure 2:
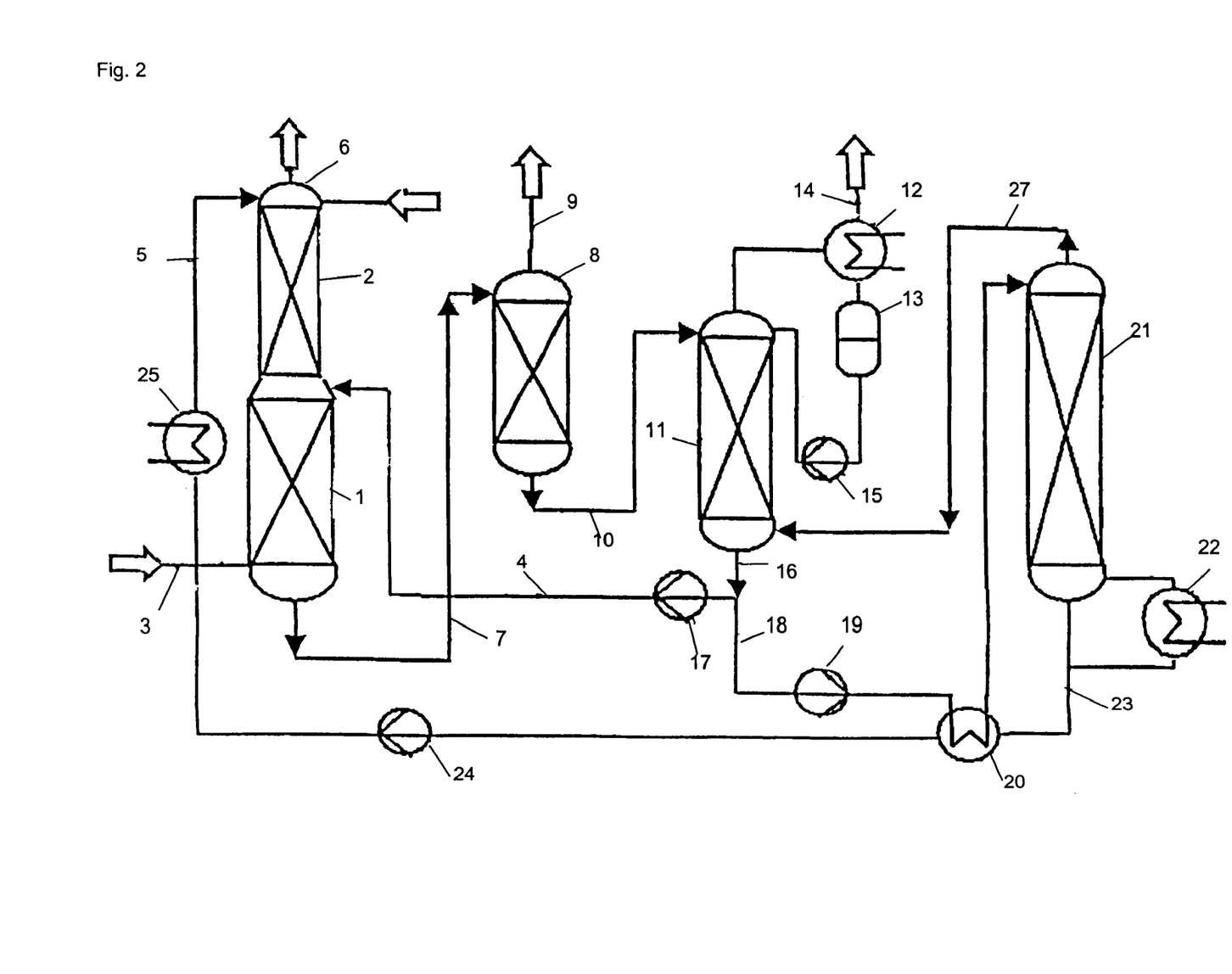
FIG. 2 is a schematic depiction of an apparatus including a two-stage absorber and a two-stage expansion.

FIG. 2 diagrammatically shows an apparatus for carrying out the inventive process, using a two-stage absorber and a two-stage expansion. The absorber comprises the crude absorber 1 and the pure absorber 2. The feed gas is fed in via line 3 to the bottom region of the crude absorber 1 and treated in countercurrent with regenerated absorption medium which is applied via line 4 to the top of the crude absorber 1 and still comprises some acid gases. Regenerated absorption medium is applied to the top of the pure absorber 2 via line 5, which regenerated absorption medium essentially no longer contains acid gases. Both parts of the absorber contain an ordered packing to effect the mass transfer and heat exchange between crude gas and absorption medium. The treated gas leaves the pure absorber 2 overhead (line 6). The absorbtion medium loaded with acid gases is discharged at the bottom of the crude absorber 1 and is fed via line 7 into the upper region of the high-pressure expansion column 8. The column 8 is equipped with an ordered packing and is operated at a pressure which is between the pressure in the absorber and the subsequent low-pressure expansion column 11. The absorption medium which is loaded with acid gases is expanded using conventional apparatuses, for example a level-control valve, a hydraulic turbine, or a pump running in reverse. In the high-pressure expansion, the greatest part of the dissolved non-acid gases and a small part of the acid gases are released. These gases are ejected overhead from the high-pressure expansion column 8 via line 9.

The absorption medium which is still loaded with the majority of acid gases leaves the high-pressure expansion column 8 via line 10 and is fed into the upper region of the low-pressure expansion column 11 where the greatest amount of the $CO_2$ and $H_2S$ are released by flashing. The absorption medium is regenerated in this manner. The low-pressure expansion column 11 is equipped with an ordered packing to provide a high surface area for the heat exchange and mass transfer. At the top of the low-pressure expansion column 11, a reflux condenser 12 is provided together with condensate vessel 13 to cool the acid gases exiting overhead from the low-pressure expansion column 11 and to condense a portion of the vapor. The uncondensed gas which contains the majority of the acid gases is discharged via line 14. The condensate from the condensate vessel 13 is applied via pump 15 to the top of the low-pressure expansion column 11.

The partially regenerated absorption medium which still contains a part of the acid gases leaves the low-pressure expansion column 11 at the bottom via line 16 and is split into two substreams. The larger substream is applied via pump 17 and line 4 to the top of the crude absorber 1, whereas the smaller part, via line 18, by means of pump 19, is heated in the heat exchanger 20. The heated absorption medium is then fed into the upper region of the stripper 21 which is equipped with an ordered packing. In the stripper 21 the majority of the absorbed $CO_2$ and $H_2S$ is stripped out by means of steam which is generated in the reboiler 22 and is fed into the lower region of the stripper 21. The absorption medium leaving the stripper 21 at the bottom via line 23 has only a small residual content of acid gases. It is passed through the heat exchanger 20, the partially regenerated absorption medium coming from the low-pressure expansion column 11 being heated. The cooled, regenerated absorption medium is pumped by means of pump 24 through heat exchanger 25 back to the top of the pure absorber 2. Via line 26, fresh water can be applied to the top of the pure absorber 2 to replace the water discharged vie the gas streams. The gas exiting overhead from the stripper 21 is fed via line 27 into the lower region of the low-pressure expansion column 11.

EXAMPLES

Example 1

In this example the velocity of sound is determined in the absorption medium under test, before and after aeration. The velocity of sound in a medium is dependent on the density and compressibility of the medium. Changes in the chemical composition of a medium are accompanied with a usually marked change in the velocity of sound. The change in the velocity of sound is therefore an index of the decomposition of the absorption medium on aeration. The velocity of sound was determined using an ultrasound probe submerged in the sample which contained the ultrasound measuring section.

In a stirred tank, monoethanolamine was charged at 100° C. and admixed with the antioxidant under test. The samples were admixed with 50 ppm of iron(II) oxalate to simulate traces of iron ions which are present in the absorption medium in industrial plants due to manufacturing conditions or owing to corrosion of iron-containing plant components. At this temperature, ml/min of air was passed through the absorption medium. The velocity of sound was determined after 10, 20, 30, 40, 50 and 60 hours. The results are reported in table 1.

TABLE 1

| Time [h] | Without antioxidant | 100 ppm of hydroquinone | 100 ppm of HO-TEMPO | 100 ppm of diphenylborinic anhydride |
|---|---|---|---|---|
| 10 | 1474.97 | 1472.69 | 1474.74 | 1473.26 |
| 20 | 1478.10 | 1476.70 | 1477.50 | 1475.27 |
| 30 | 1480.89 | 1480.28 | 1479.36 | 1478.51 |
| 40 | 1484.18 | 1484.37 | 1482.02 | 1481.37 |
| 50 | 1487.34 | 1490.31 | 1485.28 | 1483.82 |
| 60 | 1490.82 | 1494.77 | 1489.45 | 1487.32 |

It can be seen from the table that adding 1-oxyl-2,2,6,6-tetramethylpiperidin-4-ol (HO-TEMPO) or diphenylborinic anhydride led to a smaller change in the velocity of sound after 60 hours compared with the control without antioxidant. The sample containing hydroquinone showed a greater change in the velocity of sound, that is to say a greater degree of chemical decomposition than the control.

Example 2

Determination of the Isobaric Oxygen Uptake

A solution of ethanolamine (20 mmol), piperazine (0.4 mmol) and iron(II) oxalate (0.002 mmol) in 30 ml of N-methylpyrrolidone was admixed with the antioxidant under test (0.1 mmol) and stirred at 300 rpm at room temperature in a closed apparatus. The decrease of the gas volume was followed using a mounted water-filled titration burette. The change in volume was plotted as a function of time. The change in volume after 4200 min is recorded in table 2.

TABLE 2

| Antioxidant | $O_2$ uptake after 4200 min [ml] |
|---|---|
| None | 3.6 |
| Trimethylhydroquinone | 12.2 |
| 4-Methoxyphenol | 2.2 |
| 2-Dodecyl-N-(2,2,6,6-tetramethylpiperidinyl)-succinimide | 2.7 |
| 2,6-Di-tert-butyl-4-methylphenol | 2.8 |
| 2,2,6,6-Tetramethylpiperidin-4-ol | 1.8 |
| 2,2'-Thio-bis(6-tert-butyl-4-methylphenol) | 1.6 |
| Pentaerythritol tetrakis [3-(3,5-di-tert-butyl-1-4-hydroxyphenyl) propionate | 2.6 |
| 2-(2'-Hydroxy-5'-methylphenyl)benzotriazole | 2.6 |
| N,N'-Bis-formyl-N,N'-bis(2,2,6,6-tetramethyl-4-piperidyl)hexamethylenediamine | 1.6 |

The table shows that antioxidants of differing chemical structure are suitable for decreasing the oxygen uptake of the absorption medium, with the exception of the nuclear-alkylated hydroquinone derivative trimethylhydroquinone.

We claim:

1. An absorption medium for deacidifying fluid streams, comprising:
    at least one aliphatic amine; and
    at least one non-hydroquinoid antioxidant;
    wherein the antioxidant comprises at least one member selected from the group consisting of: alkylated monophenols, hydroquinone monoethers and monoesters, hydroxylated thiodiphenyl ethers, benzyl phosphonates, esters of β-(3,5-di-tert-butyl-4-hydroxyphenyl)propionic acid, 2-(2'-hydroxyphenyl)benzotriazoles, sterically hindered amines, nitroxyl free radicals and boron compounds.

2. The absorption medium of claim 1, wherein the medium has an oxygen uptake that is less than an oxygen uptake of an absorption medium without antioxidant, when in use.

3. The absorption medium of claim 1 or 2, comprising at least one alkanolamine.

4. The absorption medium of claim 1 or 2, comprising at least one member selected from the group consisting of monoethanolamine (MEA), methylaminopropylamine (MAPA), piperazine, diethanolamine (DEA), triethanolamine (TEA), diethylethanolamine (DEEA), diisopropylamine (DIPA), aminoethoxyethanol (AEE), dimethylaminopropanol (DIMAP) and methyldiethanolamine (MDEA).

5. A process for deacidifying a fluid stream, comprising bringing a fluid stream into intimate contact with the absorption medium of claim 1.

6. The process of claim 5, wherein the fluid stream comprises from 1 to 80% by volume of oxygen.

7. The process of claim 6, wherein the fluid stream originates from:
    a) oxidation of organic substances,
    b) composting or storage of waste matter comprising organic substances, or
    c) bacterial decomposition of organic substances.

8. The process of one of claims 5 to 7, wherein, after the fluid stream is brought into intimate contact with the absorption medium,
    the absorption medium regenerated by at least one of:
    a) heating,
    b) expansion, and
    c) stripping with an inert fluid; and
    the absorption medium is then recirculated to again be contacted with a fluid stream.

9. The process of one of claims 5 to 7, wherein antioxidant is periodically or continuously added to the absorption medium.

* * * * *